United States Patent
Watanabe et al.

(10) Patent No.: US 10,837,937 B2
(45) Date of Patent: Nov. 17, 2020

(54) CERAMIC HEATER, SENSOR ELEMENT, AND GAS SENSOR

(71) Applicant: NGK INSULATORS, LTD., Nagoya-shi, Aichi (JP)

(72) Inventors: Yusuke Watanabe, Nagoya (JP); Takao Murase, Konan (JP); Masashi Yasui, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 15/238,799

(22) Filed: Aug. 17, 2016

(65) Prior Publication Data

US 2017/0052142 A1    Feb. 23, 2017

(30) Foreign Application Priority Data

Aug. 21, 2015    (JP) .................... 2015-164212

(51) Int. Cl.
| | |
|---|---|
| *G01N 27/406* | (2006.01) |
| *H05B 1/02* | (2006.01) |
| *H05B 3/00* | (2006.01) |
| *H05B 3/26* | (2006.01) |

(52) U.S. Cl.
CPC ....... *G01N 27/4067* (2013.01); *H05B 1/0247* (2013.01); *H05B 3/0014* (2013.01); *H05B 3/265* (2013.01)

(58) Field of Classification Search
CPC .............. G01N 27/4067; H05B 1/0247; H05B 3/0014; H05B 3/265
USPC ....... 219/209, 543, 544, 541, 552, 553, 270, 219/267, 505, 548, 228, 229, 443.1, 474, 219/475, 478, 481, 542, 536, 538; 338/249, 254, 280, 281, 283, 291, 293, 338/307, 308, 314
See application file for complete search history.

(56) References Cited

U.S. PATENT DOCUMENTS

| | | | | | |
|---|---|---|---|---|---|
| 3,778,744 | A | * | 12/1973 | Brandi | H01C 1/14 338/260 |
| 4,639,305 | A | * | 1/1987 | Shibata | G01N 27/4071 204/408 |
| 5,444,228 | A | * | 8/1995 | Gelus | D06F 75/24 219/528 |
| 5,895,591 | A | * | 4/1999 | Kojima | G01N 27/4067 204/426 |

(Continued)

FOREIGN PATENT DOCUMENTS

| | | |
|---|---|---|
| EP | 0 167 297 A2 | 1/1986 |
| EP | 2 107 364 A1 | 10/2009 |

(Continued)

OTHER PUBLICATIONS

The Official Communication of the Third Party Observations for the corresponding German patent application No. 10 2016 215 515.6, dated Dec. 14, 2017.

(Continued)

*Primary Examiner* — Tu B Hoang
*Assistant Examiner* — Masahiko Muranami
(74) *Attorney, Agent, or Firm* — Global IP Counselors, LLP

(57) ABSTRACT

A heating element 76 of a heater section includes an inner region 91, having a lower resistance per unit length than an outer region 92 at one or more temperatures in the range of 700° C. to 900° C.

12 Claims, 3 Drawing Sheets

(56) References Cited

U.S. PATENT DOCUMENTS

| | | | |
|---|---|---|---|
| 6,169,275 B1* | 1/2001 | Noda | H05B 3/141 |
| | | | 219/542 |
| 6,287,439 B1 | 9/2001 | Kato et al. | |
| 2005/0199610 A1* | 9/2005 | Ptasienski | H05B 3/26 |
| | | | 219/543 |
| 2007/0264529 A1* | 11/2007 | Wahl | G01N 27/4067 |
| | | | 428/814 |
| 2008/0223849 A1 | 9/2008 | Naito et al. | |
| 2009/0250344 A1 | 10/2009 | Ohya et al. | |
| 2014/0102170 A1 | 4/2014 | Kato | |
| 2015/0226696 A1* | 8/2015 | Satou | G01N 27/4067 |
| | | | 204/426 |

FOREIGN PATENT DOCUMENTS

| | | |
|---|---|---|
| JP | 60-259951 A | 12/1985 |
| JP | 8-75690 | 3/1996 |
| JP | 3571494 | 7/2004 |
| JP | 2004-253396 | 9/2004 |
| JP | 2008-151558 A | 7/2008 |
| JP | 2009-265085 A | 11/2009 |
| JP | 4826461 | 9/2011 |
| JP | 2015-153479 A | 8/2015 |
| WO | 2013/005491 A1 | 1/2013 |

OTHER PUBLICATIONS

Third Party Submission dated Jul. 16, 2019 in corresponding Japanese Patent Application No. 2015-164212 (with English Translation).

Notice of Reasons for Refusal for the corresponding Japanese application No. 2015-164212, dated Mar. 24, 2020.

* cited by examiner

CERAMIC HEATER, SENSOR ELEMENT, AND GAS SENSOR

BACKGROUND OF THE INVENTION

1. Field of the Invention

The present invention relates to a ceramic heater, a sensor element, and a gas sensor.

2. Description of the Related Art

There has been known ceramic heaters including a ceramic sheet and a heater pattern that is folded a plurality of times in the longitudinal direction of the ceramic sheet (for example, PTL 1). The heater pattern disclosed in PTL 1 includes straight conducting segments extending along the longitudinal direction, and a curved conducting segment connecting the straight conducting segments. Another type of ceramic heater has also been known which includes a pattern including straight portions extending along the short-length direction and a folded portion connecting the straight portions (for example, PTL 2).

CITATION LIST

Patent Literature

PTL 1: Japanese Patent No. 4826461
PTL 2: Japanese Patent No. 3571494

SUMMARY OF THE INVENTION

In these ceramic heaters, the heating element can be degraded by oxidation of conductors defining the heating element at high temperature, thus resulting in disconnection.

The present invention is intended to solve this problem, and a major object of the invention is to extend the life of the heating element.

In order to achieve the major object, the following is provided.

A ceramic heater according to the present invention includes a heating element including an outer region, and an inner region having a lower resistance per unit length than the outer region at one or more temperature in the range of 700° C. to 900° C., and a ceramic body surrounding the heating element.

In this ceramic heater, the inner region of the heating element has a lower resistance per unit length than the outer region at one or more temperatures in the range of 700° C. to 900° C. Consequently, the inner region has a lower heating density (quantity of heat generation per unit length) than the outer region at one or more temperatures in the range of 700° C. to 900° C. In general, the inner region of the heating element is likely to have higher temperature and, is accordingly, more likely to be degraded than the outer region. In the ceramic heater of the present invention, however, the heating density of the inner region is lower than that in the outer region. Accordingly, the temperature increase of the inner region, which tends to have higher temperature, can be suppressed, and thus the degradation of the inner region, which is, in general, more likely to be degraded, can be prevented. Thus, the life of the heating element is extended as a whole.

In the ceramic heater of the present invention, the ratio R1/R2 of unit resistance R1 [μΩ/mm] being the resistance per unit length of the inner region to unit resistance R2 [μΩ/mm] being the resistance per unit length of the outer region may be 0.87 or less at one or more temperatures in the above temperature range. Thus, the degradation of the inner region can be further reduced. Preferably, the unit resistance ratio R1/R2 is 0.80 or less at one or more temperatures in the above temperature range.

In the ceramic heater of the present invention, the cross section of the inner region taken in the direction perpendicular to the length direction thereof may have a larger area than that of the outer region. Thus, the resistance per unit length of the inner region tends to be lower than that of the outer region. In this instance, preferably, the ratio S2/S1 of the area S2 [mm$^2$] of the cross section of the outer region taken in the direction perpendicular to the length direction thereof to the area S1 [mm$^2$] of the cross section of the inner region taken in the direction perpendicular to the length direction thereof is 0.87 or less. Thus, the unit resistance ratio R1/R2 tends to be 0.87 or less at one or more temperatures in the above temperature range. More preferably, the cross-sectional area ratio S2/S1 is 0.80 or less.

In the ceramic heater of the present invention, the inner region may have a lower volume resistivity than the outer region at one or more temperatures in the above temperature range. Thus, the resistance per unit length of the inner region tends to be lower than that of the outer region. In this instance, preferably, the ratio ρ1/ρ2 of the volume resistivity ρ1 [μΩ·cm] of the inner region to the volume resistivity ρ2 [μΩ·cm] of the outer region is 0.87 or less at one or more temperatures in the above temperature range. Thus, the unit resistance ratio R1/R2 tends to be 0.87 or less at one or more temperatures in the above temperature range. More preferably, the volume resistivity ratio ρ1/ρ2 is 0.80 or less at one or more temperatures in the above temperature range.

In the ceramic heater of the present invention, the ceramic body may be a plate-like body having a longitudinal direction and a short-length direction. In this instance, the heating element includes a four or more straight portions arranged along the short-length direction and each extending in the longitudinal direction, a plurality of one-end side curved portions each connecting a pair of the straight portions adjacent to each other in the short-length direction at one end in the longitudinal direction, and at least one other-end side curved portion connecting a pair of the straight portions adjacent to each other in the short-length direction at the other end side.

A sensor element according to the present invention includes the ceramic heater according to any of the above-described embodiments.

The sensor element is used to detect the concentration of a specific gas in a measurement-object gas.

Since the sensor element includes the ceramic heater of any of the above-described embodiments, the sensor element can produce the same effect as the ceramic heater, for example, the effect of extending the life of the heating element.

A gas sensor of the present invention includes the above-described sensor element.

Since the gas sensor includes the sensor element including the ceramic heater of any of the above-described embodiments, the gas sensor can produce the same effect as the ceramic heater and the sensor element, for example, the effect of extending the life of the heating element.

DETAILED DESCRIPTION OF THE INVENTION

Figure 1:
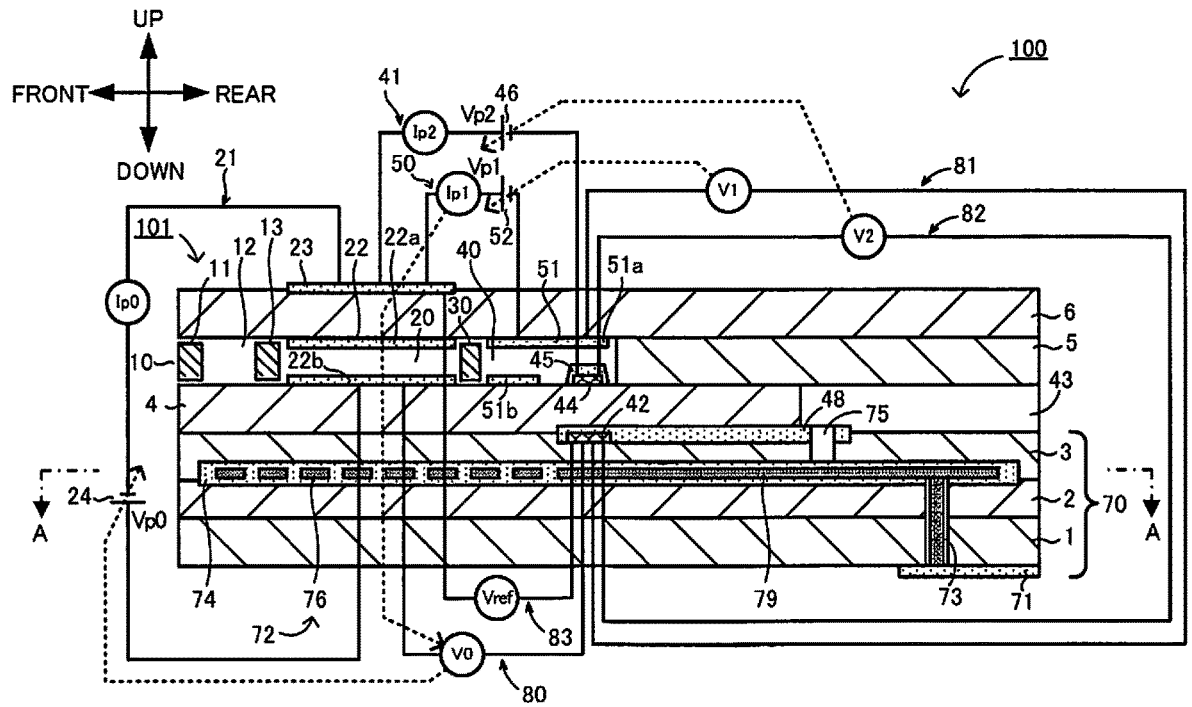
FIG. 1 is a schematic sectional view of an example of the structure of a gas sensor 100.
Figure 2:
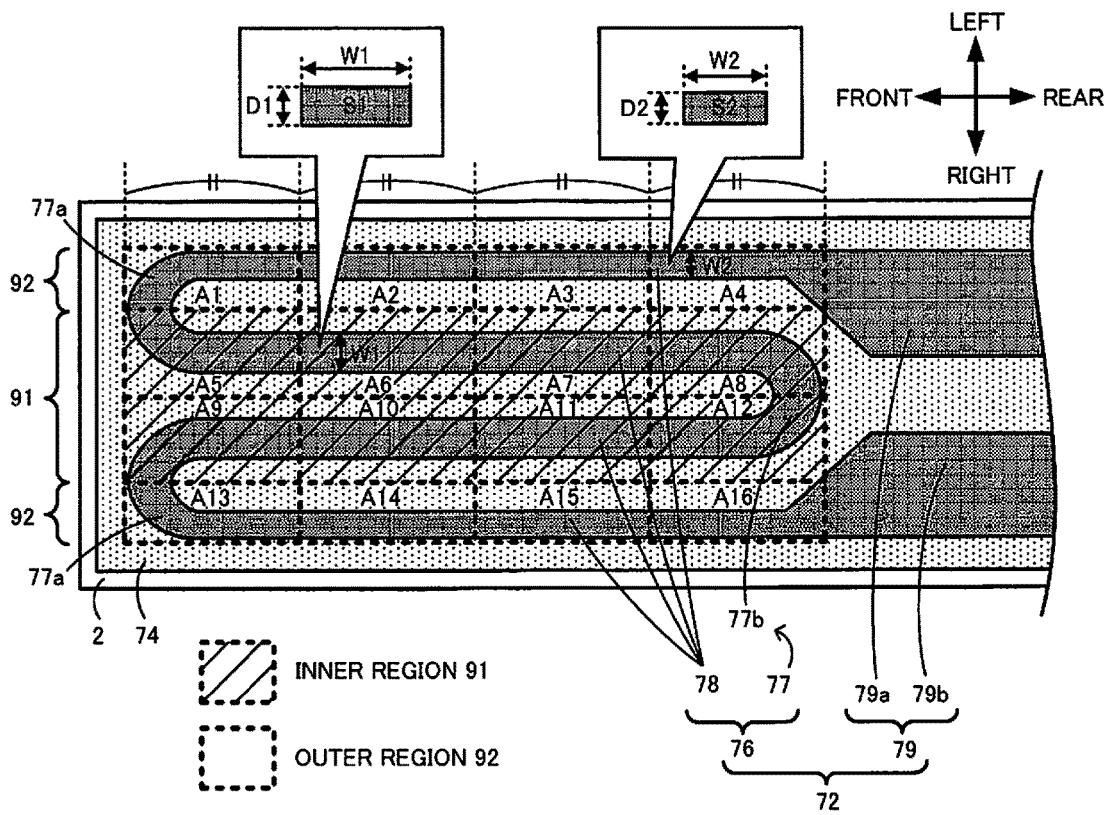
FIG. 2 is a sectional view taken along line A-A in FIG. 1 and an explanatory view of an inner region 91 and outer regions 92 defined by the first method.

Embodiments of the present invention will now be described with reference to the drawings. FIG. 1 is a schematic sectional view of an example of the structure of a gas sensor 100 of an embodiment of the present invention. FIG. 2 is a sectional view taken along line A-A in FIG. 1. The gas sensor 100 is such that a sensor element 101 therein detects the concentration of a specific gas, such as NOx gas, in a measurement-object gas, such as exhaust gas from automobiles. The sensor element 101 is in the shape of a long rectangular parallelepiped. The longitudinal direction (lateral direction in FIG. 1) of this sensor element 101 is defined as the front-rear direction, and the thickness direction (vertical direction in FIG. 1) of the sensor element 101 is defined as the vertical direction. The width direction (perpendicular to the front-rear direction and the vertical direction) of the sensor element 101 is defined as the left-right direction.

The sensor element 101 has a multilayer structure defined by a stack of six oxygen ion conductive solid electrolyte layers made of, for example, zirconia ($ZrO_2$) that are a first substrate layer 1, a second substrate 2, a third substrate layer 3, a first solid electrolyte layer 4, a spacer layer 5, and a second solid electrolyte layer 6 stacked in that order from the lower side of the figure. The solid electrolyte of the six layers is densely airtight. The sensor element 101 is manufactured by stacking, for example, ceramic green sheets that have been processed according to the respective layers and provided with the respective circuit patterns by printing, and sintering the stack into one body.

In the sensor element 101, at one end thereof, a gas inlet 10, a first diffusion controlling portion 11, a buffering space 12, a second diffusion controlling portion 13, a first internal void space 20, a third diffusion controlling portion 30, and a second internal void space 40 are formed so as to communicate one after another in that order between the lower surface of the second solid electrolyte layer 6 and the upper surface of the first solid electrolyte layer 4.

The gas inlet 10, the buffering space 12, the first internal void space 20, and the second internal void space 40 are each a space in the sensor element 101 formed by boring the spacer 5 in such a manner that the upper side is defined by the lower surface of the second solid electrolyte layer 6, the lower side is defined by the upper surface of the first solid electrolyte layer 4, and the side walls are defined by the side surfaces of the spacer 5.

The first diffusion controlling portion 11, the second diffusion controlling portion 13, and the third diffusion controlling portion 30 are each provided with two laterally long slits therein (whose opening has a longitudinal direction perpendicular to the figure). The portion from the gas inlet 10 to the second internal void space 40 may be referred to as a gas delivering section.

At a position more distant from the end side than the gas delivering section, a reference gas introducing space 43 is formed between the upper surface of the third substrate 3 and the lower surface of the spacer 5 in such a manner that the side wall is defined by a side surface of the first solid electrolyte layer 4. Into the reference gas introducing space 43, for example, air is introduced as a reference gas for NOx concentration measurement.

An air introducing layer 48 is a porous layer made of a porous ceramic, and to which a reference gas is introduced through the reference gas introducing space 43. Also, the air introducing layer 48 is disposed so as to cover a reference electrode 42.

The reference electrode 42 is disposed between the upper surface of the third substrate 3 and the first solid electrolyte layer 4, and is provided therearound with the air introducing layer 48 communicating with the reference gas introducing space 43. The reference electrode 42 is used for measuring the oxygen concentration (oxygen partial pressure) in the first internal void space 20 and the second internal void space 40, as will be described later.

The gas inlet 10 in the gas delivering section is open to an external space, and through which a measurement-object gas is introduced into the sensor element 101 from the external space. The first diffusion controlling portion 11 gives a predetermined diffusion resistance to the measurement-object gas that has been introduced through the gas inlet 10. The buffering space 12 is intended to deliver the measurement-object gas introduced through the first diffusion controlling portion 11 to the second diffusion controlling portion 13. The second diffusion controlling portion 13 gives a predetermined diffusion resistance to the measurement-object gas that is being introduced to the first internal void space 20 through the buffering space 12. When a measurement-object gas is delivered to the first internal void space 20 from the outside of the sensor element 101, the measurement-object gas rapidly taken into the sensor element 101 through the gas inlet 10 by pressure fluctuation of the measurement-object gas (for the case of measuring automotive exhaust gas, pulsation of exhaust gas pressure) in the external space is passed through the first diffusion controlling portion 11, the buffering space 12, and the second diffusion controlling portion 13 to cancel the fluctuation in concentration of the measurement-object gas before being delivered to the first internal void space 20, instead of being directly delivered to the first internal void space 20, and is then delivered to the first internal void space 20. Thus, the fluctuation in concentration of the measurement-object gas delivered to the first internal void space 20 is substantially negligible. The first internal void space 20 is intended to control the oxygen partial pressure of the measurement-object gas delivered through the second diffusion controlling portion 13. The oxygen partial pressure is controlled by the operation of a main pump cell 21.

The main pump cell 21 is an electrochemical pump cell including an inner pump electrode 22 having a ceiling electrode portion 22a disposed over substantially the entire lower surface of the portion of the second solid electrolyte layer 6 opposing the first internal void space 20; an outer pump electrode 23 disposed so as to be exposed to the external space in the region of the upper surface of the second solid electrolyte layer 6 corresponding to the ceiling electrode portion 22a; and the second solid electrolyte layer 6 between the inner and the outer pump electrode.

The inner pump electrode 22 is formed so as to be across the upper and the lower solid electrolyte layer (the second solid electrolyte layer 6 and the first solid electrolyte layer 4) defining the first internal void space 20, and the spacer layer 5 defining the side walls. More specifically, the ceiling electrode portion 22a is formed on the lower surface of the second solid electrolyte layer 6 defining the ceiling of the first internal void space 20; a bottom electrode portion 22b is formed on the upper surface of the first solid electrolyte layer 4 defining the bottom of the first internal void space 20; and side electrode portions (not shown) are formed on the side wall surfaces (inner surfaces) of the spacer layer 5 defining the side walls of the first internal void space 20 so as to connect the ceiling electrode portion 22a and the bottom electrode portion 22b. Thus, the inner pump electrode 22 is in the form of a tunnel.

The inner pump electrode 22 and the outer pump electrode 23 are porous cermet electrodes (for example, cermet electrodes of Pt containing 1% of Au and $ZrO_2$). The inner pump electrode 22, which comes in contact with the measurement-object gas, is made of a material whose ability to reduce the NOx in the measurement-object gas has been weakened.

The main pump cell 21 is configured so that the oxygen in the first internal void space 20 can be pumped out to the external space or external oxygen can be pumped into the first internal void space 20 by applying a desired pump voltage Vp0 between the inner pump electrode 22 and the outer pump electrode 23 to pass a positive or negative pump current Ip0 between the inner pump electrode 22 and the outer pump electrode 23.

In addition, in order to detect the oxygen concentration (oxygen partial pressure) in the atmosphere in the first internal void space 20, the inner pump electrode 22, the second solid electrolyte layer 6, the spacer layer 5, the first solid electrolyte layer 4, the third substrate layer 3, and the reference electrode 42 constitute an electrochemical sensor cell, that is, a main pump controlling oxygen partial pressure detecting sensor cell 80.

By measuring the electromotive force V0 of the main pump controlling oxygen partial pressure detecting sensor cell 80, the oxygen concentration (oxygen partial pressure) in the first internal void space 20 can be known. Furthermore, the pump current Ip0 is controlled by feedback-controlling the pump voltage Vp0 of a variable power supply 24 so that the electromotive force V0 can be constant. Thus, the oxygen concentration in the first internal void space 20 is kept constant at a specific value.

The third diffusion controlling portion 30 gives a predetermined diffusion resistance to the measurement-object gas in which the oxygen concentration (oxygen partial pressure) has been controlled in the first internal void space 20 by the operation of the main pump cell 21 and delivers the measurement-object gas to the second internal void space 40.

The second internal void space 40 is formed as a space in which a process for measuring the nitrogen oxide (NOx) concentration in the measurement-object gas delivered through the third diffusion controlling portion 30 is performed. NOx concentration is measured mainly in the second internal void space 40 in which the oxygen concentration is controlled with an auxiliary pump cell 50, and, in addition, by the operation of a measurement pump cell 41.

The second internal void space 40 further controls, with the auxiliary pump cell 50, the oxygen partial pressure in the measurement-object gas that has been subjected to control of the oxygen concentration (oxygen partial pressure) in advance in the first internal void space 20 and then delivered through the third diffusion controlling portion 30. Thus, the oxygen concentration in the second internal void space 40 is precisely kept constant, and accordingly, the gas sensor 100 is allowed to highly precisely measure NOx concentration.

The auxiliary pump cell 50 is an auxiliary electrochemical pump cell including an auxiliary pump electrode 51 having a ceiling electrode portion 51a disposed over substantially the entire lower surface of the second solid electrolyte layer 6 that feces the second internal void space 40; the outer pump electrode 23 (an appropriate electrode outside the sensor element 101 suffices without being limited to the outer pump electrode 23); and the second solid electrolyte layer 6.

The auxiliary pump cell 51 is disposed in the second internal void space 40 at a tunnel shaped structure, in the same manner as the inner pump electrode 22 disposed in the first internal void space 20. More specifically, the ceiling electrode portion 51a is formed on the portion of the second solid electrolyte layer 6 defining the ceiling of the second internal void space 40; a bottom electrode portion 51b is formed on the portion of the first solid electrolyte layer 4 defining the bottom of the second internal void space 40; and side electrode portion (not shown) connecting the ceiling electrode portion 51a and the bottom electrode portion 51b are formed on the side wall surfaces of the spacer layer 5 defining the side walls of the second internal void space 20. As with the inner pump electrode 22, the auxiliary pump electrode 51 is made of a material whose ability to reduce the NOx in the measurement-object gas has been weakened.

The auxiliary pump cell 50 is configured so that the oxygen in the atmosphere in the second internal void space 40 can be pumped out to the external space or external oxygen can be pumped into the second internal void space 40 by applying a desired pump voltage Vp1 between the auxiliary pump electrode 51 and the outer pump electrode 23.

In addition, in order to control the oxygen partial pressure in the atmosphere in the second internal void space 40, the auxiliary pump electrode 51, the reference electrode 42, the second solid electrolyte layer 6, the spacer layer 5, the first solid electrolyte layer 4, and the third substrate layer 3 constitute an electrochemical sensor cell, that is, an auxiliary pump controlling oxygen partial pressure detecting sensor cell 81.

The pumping of the auxiliary pump cell 50 is operated by a variable power supply 52 whose voltage is controlled according to the electromotive force V1 detected by the auxiliary pump controlling oxygen partial pressure detecting sensor cell 81. Thus, the oxygen partial pressure in the atmosphere in the second internal void space 40 is controlled to be a low partial pressure that does not substantially affect NOx measurement.

In addition, pump current Ip1 is used for controlling the electromotive force of the main pump controlling oxygen partial pressure detecting sensor cell 80. More specifically, a pump current Ip1 is input as a control signal to the main pump controlling oxygen partial pressure detecting sensor cell 80 to control the electromotive force V0 of the sensor cell 80, thereby controlling the gradient of the oxygen partial pressure in the measurement-object gas that is being delivered to the second internal void space 40 through the third diffusion controlling portion 30 to be always constant. In use as a NOx sensor, the oxygen concentration in the second internal void space 40 is about 0.001 ppm and is thus kept constant by the operation of the main pump cell 21 and the auxiliary pump cell 50.

The measurement pump cell 41 measures the NOx concentration in the measurement-object gas in the second internal void space 40. The measurement pump cell 41 is an electrochemical pump cell including a measurement electrode 44 disposed on the upper surface of the first solid electrolyte layer 4 that faces the second internal void space 40, apart from the third diffusion controlling portion 30; the outer pump electrode 23; the second solid electrolyte layer 6; the spacer electrode 5; and the first solid electrolyte layer 4.

The measurement electrode 44 is a porous cermet electrode. The measurement electrode 44 functions also as a NOx reducing catalyst that reduces the NOx in the atmosphere in the second internal void space 40. The measurement electrode 44 is covered with a fourth diffusion controlling portion 45.

The fourth diffusion controlling portion 45 is a film made of a porous ceramic. The fourth diffusion controlling portion 45 not only functions to restrict the amount of NOx flowing into the measurement electrode 44, but also functions as a protective film of the measurement electrode 44. The measurement pump cell 41 pumps out oxygen produced by decomposition of the nitrogen oxides in the atmosphere around the measurement electrode 44 and detects the amount of the oxygen as pump current Ip2.

In addition, in order to detect the oxygen partial pressure in the atmosphere around the measurement electrode 44, the first solid electrolyte layer 4, the third substrate layer 3, the measurement electrode 44, and the reference electrode 42 constitute an electrochemical sensor cell, that is, a measurement pump controlling oxygen partial pressure detecting sensor cell 82. A variable power supply 46 is controlled according to the electromotive force V2 detected by the measurement pump controlling oxygen partial pressure detecting sensor cell 82.

The measurement-object gas delivered to the second internal void space 40 will reach the measurement electrode 44 through the fourth diffusion controlling portion 45 with an oxygen partial pressure controlled. The nitrogen oxide in the measurement-object gas around the measurement electrode 44 is reduced ($2NO \rightarrow N_2 \rightarrow O_2$) to produce oxygen. The oxygen thus produced will be pumped by the measurement pump cell 41. At this time, the voltage Vp2 of the variable power supply 46 is controlled so that the electromotive force V2 detected by the measurement pump controlling oxygen partial pressure detecting sensor cell 82 can be constant. Since the amount of oxygen produced around the measurement electrode 44 is proportional to the nitrogen oxide concentration in the measurement-object gas, the nitrogen oxide concentration in the measurement-object gas is calculated using the pump current Ip2 of the measurement pump cell 41.

Alternatively, by combining the measurement electrode 44, the first solid electrolyte layer 4, the third substrate layer 3, and the reference electrode 42 to constitute an oxygen partial pressure detecting mechanism as an electromechanical sensor cell, the electromotive force generated according to the difference between the amount of oxygen produced by reduction of the NOx in the atmosphere around the measurement electrode 44 and the amount of oxygen contained in the reference air can be detected, and thus the NOx concentration in the measurement-object gas can be determined from this electromotive force.

The electrochemical sensor cell 83 is made up of the second solid electrolyte layer 6, the spacer layer 5, the first solid electrolyte layer 4, the third substrate layer 3, the outer pump electrode 23, and the reference electrode 42. The oxygen partial pressure in the measurement-object gas outside the sensor can be determined from the electromotive force Vref generated in this sensor cell 83.

In the gas sensor 100 having the above-described structure, the measurement pump cell 41 receives a measurement-object gas in which the oxygen partial pressure is kept low and constant (to the extent that NOx measurement is substantially not affected) by the operation of the main pump cell 21 and the auxiliary pump cell 50. Thus, the NOx concentration in the measurement-object gas can be known according to the pump current Ip2 caused by the operation of the measurement pump cell 41 to pump out oxygen produced by reduction of NOx substantially in proportion to the NOx concentration in the measurement-object gas.

Furthermore, the sensor element 101 includes a heater section 70 adapted to heat the sensor element 101 and keep the sensor element 101 warm so as to increase the oxygen ion conductivity of the solid electrolyte. The heater section 70 includes a heater connector electrode 71, a heater 72, a portion defining a through-hole 73, a heater insulating layer 74, and a portion defining a pressure release hole 75. The heater section 70 also includes the first substrate layer 1, the second substrate layer 2, and the third substrate layer 3, each made of a ceramic. The heater section 70 is structured as a ceramic heater including the heater 72, and the second and the third substrate layer 2 and 3 surrounding the heater 72. The heater 72 includes a heating section 76 and a lead section 79, as shown in FIG. 2.

The heater connector electrode 71 is in contact with the lower surface of the first substrate layer 1. By connecting the heater connector electrode 71 to an external power source, electricity is supplied from the outside to the heater section 70.

The heating section 76 of the heater 72 is an electric resistor disposed between the second substrate layer 2 and the third substrate layer 3 in contact therewith. The lead section 79 of the heater 72 is connected to the heater connector electrode 71 through the through-hole 73. When electricity is supplied through the heater connector electrode 71 from the outside, the heating section 76 heats to heat the solid electrolyte of the sensor element 101 and keep the solid electrolyte warm.

The heating section 76 of the heater 72 is embedded under the entire region from the first internal void space 20 to the second internal void space 40 so as to control the entirety of the sensor element 101 to a temperature at which the solid electrolyte is activated.

The heater insulating layer 74 is an insulating layer formed of an insulating material such as alumina over the upper and the lower surface of the heater 72. The heater insulating layer 74 is formed to provide electrical insulation between the second substrate layer 2 and the heater 72 and electrical insulation between the third substrate layer 3 and the heater 72.

The pressure release hole 75 passes through the third substrate layer 3 and communicates with the reference gas introducing space 43 and is intended to alleviate internal pressure increase with increasing temperature in the heater insulating layer 74.

The heating section 76 and the lead section 79 of the heater 72 will now be described in detail. The heating section 76 is a resistance heating element and has a shape of a one-stroke strip connected to the lead section 79, as shown in FIG. 2. The heating section 76 includes a plurality (three, in the present embodiment) of curved portions 77 and a plurality (four, in the present embodiment) of straight portions 78. The curved portions 77 and the straight portions 78 are electrically connected in series. The heating section 76 is bilaterally symmetrical.

The straight portions 78 are arranged at regular intervals in the short-length direction (left-right direction) of the sensor element 101. Each of the straight portions 78 extends along the longitudinal direction (front-rear direction) of the sensor element 101. In the present embodiment, the straight portions 78 are arranged in such a manner that the length direction thereof is parallel to the front-rear direction. The rear end of the leftmost one of the straight portions 78 is connected to a first lead 79a. The rear end of the rightmost one of the straight portions 78 is connected to a second lead 79b.

Each curved portion 77 connects a pair of the straight portions 78 adjacent to each other in the left-right direction. The curved portions 77 include head side curved portions 77a, each connecting the front ends (at one end) of a pair of the adjacent straight portions 78, and at least one rear side curved portion 77b connecting the rear ends (at the other end) of a pair of the adjacent straight portions 78. In the present embodiment, the curved portions 77 include two head side curved portions 77a and one rear side curved portion 77b. Each of the curved portions 77 is bent to form a curve and in the shape of the arc of a semicircle. The curved portions 77 may have a linearly bent shape.

In the present embodiment, the heating section 76 is made of a cermet containing a noble metal and a ceramic (for example, platinum (Pt) and alumina ($Al_2O_3$)). The material of the heating section 76 may be an electroconductive material such as a noble metal without being limited to cermet. Examples of the noble metal used in the heating section 76 include at least one of platinum, rhodium (Rh), gold (Au), and palladium (Pd), or an alloy of these noble metals.

The heating section 76 has an outer region 92 and an inner region 91. The inner region 91 have a lower resistance per unit length than the outer region 92 at one or more temperature in the range of 700° C. to 900° C. The inner region 91 and the outer region 92 are defined by any one of the following first to third methods.

The first method will be described with reference to FIG. 2. First, the heating section 76 is divided into four in the front-rear direction and four in the left-right direction, thus divided into a 1st to a 16th segment A1 to A16. For dividing in the front-rear direction, the region from the front ends of the curved portions 77 (the front ends of the head side curved portions 77a) to the rear ends of the curved portions 77 (the rear ends of the rear side curved portions 77b) is evenly divided into four. For dividing the heating section 76 in the left-right direction, the entire region of the heating section 76 is divided in such a manner that each part of the heating section 76 includes at least one straight portion 78. The number of the straight portions 78 included in each part of the heating section 76 is defined by the quotient (1, in the present embodiment) obtained by dividing the number (4, in the present embodiment) of the straight portions 78 included in the heating section 76 by a value 4. For dividing, the division lines (dashed lines in FIG. 2) are given perpendicular to the length direction of the corresponding portion of the heating section 76. The length direction mentioned herein refers to the axis direction of the heating section 76 (the curved portions 77 and the straight portions 78), that is, the direction in which current flows. The 5th to the 12th segment A5 to A12 of the 1st to the 16th segment A1 to A16, on the inner side of the left-right direction define the inner region 91 (the shaded area in FIG. 2), and the 1st to the 4th segment A1 to A4 and the 13th to the 16th segment A13 to A16 define the outer region 92.

Figure 3:
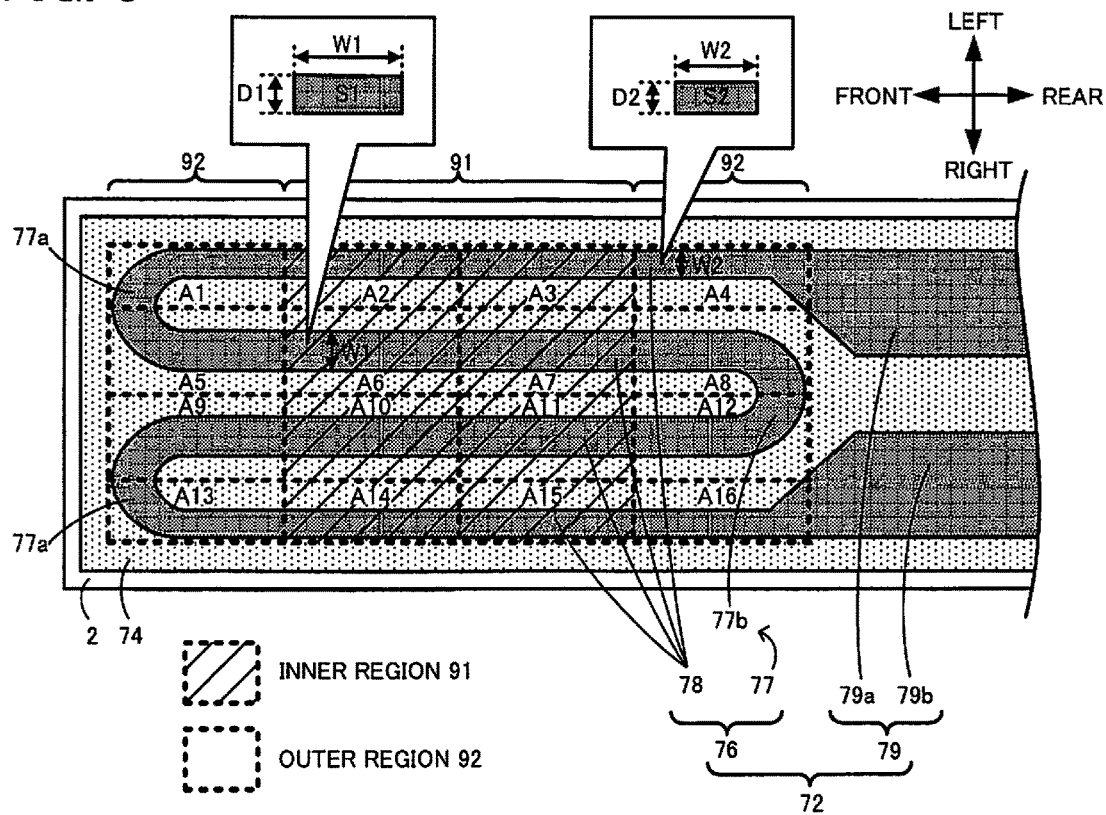
FIG. 3 is an explanatory view of the inner region 91 and outer regions 92 defined by the second method.

The second method will be described with reference to FIG. 3. The second method is the same as the first method in that the heating section 76 are divided into 16 segments: the 1st to the 16th segment A1 to A16. In the second method, then, the 2nd, the 3rd, the 6th, the 7th, the 10th, the 11th, the 14th, and the 15th segment A2, A3, A6, A7, A10, A11, A14, and A15 of the 1st to the 16th segment A1 to A16, on the inner side of the front-rear direction define an inner region 91 (the shaded area in FIG. 3), and the 1st, the 4th, the 5th, the 8th, the 9th, the 12th, the 13th, and the 16th segment A1, A4, A5, A8, A9, A12, A13, and A16 define outer regions 92.

Figure 4:
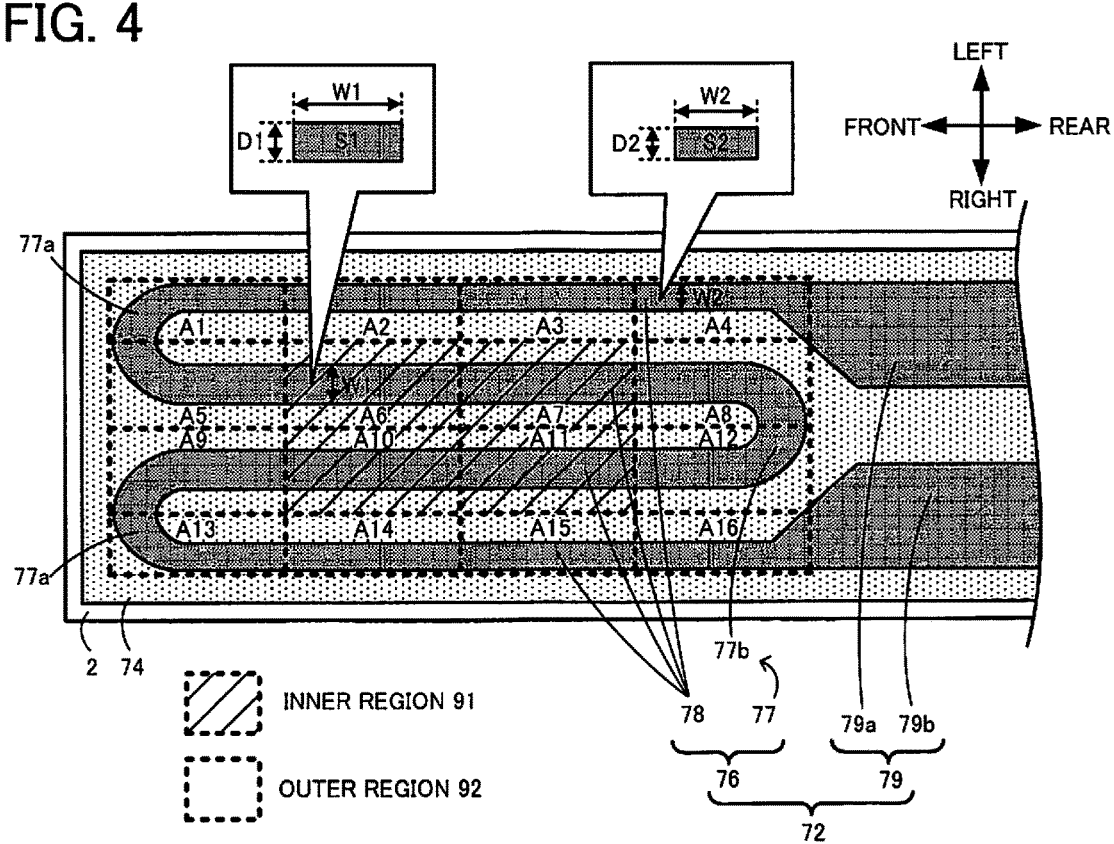
FIG. 4 is an explanatory view of the inner region 91 and outer regions 92 defined by the third method.

The third method will be described with reference to FIG. 4. The third method is the same as the first method in that the heating section 76 are divided into 16 segments: the 1st to the 16th segment A1 to A16. In the third method, then, the 6th, the 7th, the 10th, and the 11th segment A6, A7, A10, and A11 of the 1st to the 16th segment A1 to A16, on the inner side of the left-right direction define an inner region 91 (the shaded area in FIG. 4), and the 1st to the 4th, the 5th, the 8th, the 9th, the 12th, and the 13th to the 16th segment A1 to A4, A5, A8, A9, A12, and A13 to A16 define an outer region 92.

When the heating section 76 is divided into the inner region 91 and the outer region 92 in accordance with any one of the first to the third method, the portions of the heating section 76 in the inner region 91 have a lower resistance per unit length than the outer region 92. The resistance per unit length is, more specifically, the resistance per unit length at one or more temperatures in the range of 700° C. to 900° C. to which the heating section 76 can be heated. In other words, the ratio R1/R2 of unit resistance R1 [$\mu\Omega$/mm] that is the resistance per unit length of the inner region 91 to unit resistance R2 [$\mu\Omega$/mm] that is the resistance per unit length of the outer region 92 is less than 1 at one or more temperatures in that temperature range. Thus, the portions in inner region 91 have a lower heating density (quantity of heat generation per unit length) than the outer region 92 at one or more temperatures in the range of 700° C. to 900° C., and accordingly, the temperature increase in the inner region 92 is suppressed. In general, the inner region 91 of the heating section 76 is likely to have higher temperature than the outer region 92. As temperature increases, the heating section 76 is more likely to be degraded due to oxidation thereof (for example, oxidation of Pt that is a noble metal in the heating section 76). By controlling the unit resistance ratio R1/R2 to less than 1, the temperature increase of the inner region 91, which is likely to have higher temperature, can be suppressed, and thus the degradation of the inner region 91, which is generally likely to be degraded, can be prevented. Thus, the life of the entire heater 72 (particularly the entire heating section 76) is extended.

Unit resistances R1 and R2 are defined by the averages of resistances per unit length of the inner region 91 and the outer region 92, respectively. Therefore, even if a portion of the inner region 91 has a higher resistance per unit length than the outer region 92, it is considered to be acceptable as long as the resistance per unit length, as a whole, of the inner region 91 is lower than that of portions in the outer region 92. It is however preferable that the resistance per unit length of any portion of the inner region 91 be lower than unit resistance R2. In the heating section 76, preferably, the unit resistance ratio R1/R2 is less than 1 at any temperature in the above temperature range. In the heating section 76, more preferably, the unit resistance ratio R1/R2 is 0.87 or less, more preferably 0.80 or less, at one or more temperatures in the above temperature range. The unit resistance ratio R1/R2 may be 0.5 or more at any temperature in the above temperature range.

Preferably, the resistance per unit length of the portions in the middle segments (the 6th, the 7th, the 10th, and the 11th segment A6, A7, A10, and A11) in the front-rear direction of the inner region 91 defined by the first method is lower than or equal to the resistance of the portions in the outer segments (the 5th, the 8th, the 9th, and the 12th segment A5, A8, A9, and A12) in the front-rear direction of the inner region 91. Similarly, it is preferable that the resistance per unit length of the portions in the middle segments (the 6th, the 7th, the 10th, and the 11th segment A6, A7, A10, and A11) in the left-right direction of the inner region 91 defined by the second method be lower than or equal to the resistance of the outer segments (the 2nd, the 3rd, the 14th, and the 15th segment A2, A3, A14, and A15) in the left-right direction of the inner region 91.

In the present embodiment, the inner region 91 and the outer region 92 of the heating section 76 defined by any one of the first to the third method are made of the same material (cermet containing platinum, as described above), and the area S1 [mm$^2$] of the cross section of the inner region 91 taken in the direction perpendicular to the length direction thereof is larger than the area S2 [mm$^2$] of the cross section of the outer region 92 taken in the direction perpendicular to the length direction thereof. Hence, the heating section 76 has a cross-sectional area ratio S2/S1 of less than 1. In this instance, the unit resistance ratio R1/R2 is less than 1 at any temperature in the range of 700° C. to 900° C. Cross-sectional areas S1 and S2 are defined by the averages thereof of the inner region 91 and the outer region 92, respectively, as with unit resistances R1 and R2. In the present embodiment, the cross-sectional areas of the two straight portions 78 in the middle in the left-right direction, the inner side of each of the two head side curved portions 77a in the left-right direction, and the rear side curved portion 77b are larger than the cross-sectional area of the other portions of the heating section 76. In comparison between the inner region 91 and the outer region 92 defined by the first method, the cross-sectional area of the inner region 91 is larger than cross-sectional area S2. Also, in the case of defining the inner region 91 and the outer region 92 by the third method (see FIG. 4), the cross-sectional area ratio S2/S1 is less than 1, and the unit resistance ratio R1/R2 is less than 1. The portion of the left head side curved portion 77a in the 1st segment A1 has a cross-sectional area gradually varying along the length direction. Similarly, the portion of the right head side curved portion 77a in the 13th segment A13 has a cross-sectional area gradually varying along the length direction.

Preferably, the cross-sectional area ratio S2/S1 is 0.87 or less, more preferably 0.80 or less. The cross-sectional area ratio S2/S1 may be controlled, for example, by at least either the operations of setting the width W1 of the inner region 91 to be larger than the width W2 of the outer region 92, or the operation of setting the thickness D1 of the inner region 91 to be larger than the thickness D2 of the outer region 92. For example, in the case of width W1>width W2, any relationship of thickness D1<thickness D2, thickness D1=thickness D2, and thickness D1>thickness D2 may be applied, as long as the cross-sectional area ratio S2/S1 is less than 1. Similarly, in the case of thickness D1>thickness D2, any relationship of width W1<width W2, width W1=width W2, and width W1>width W2 may be applied, as long as the cross-sectional area ratio S2/S1 is less than 1. The cross-sectional area ratio S2/S1 may be 0.5 or more. Widths W1 and W2 may be in the range of 0.05 mm to 1.5 mm. Thicknesses D1 and D2 may be in the range of 0.003 mm to 0.1 mm.

The lead section 79 includes the first lead 79a located to the rear left of the heating section 76, and the second lead 79b located to the rear right of the heating section 76. The first and the second lead 79a and 79b are used for supplying electricity to the heating section 76 and are connected to the heater connector electrode 71. The first lead 79a is a positive lead, and the second lead 79b is a negative lead. By applying a voltage between the first and the second lead 79a and 79b, a current flows to the heating section 76, and thus the heating section 76 heats. The lead section 79, which is an electric conductor, has a lower resistance per unit length than the heating section 76. Unlike the heating section 76, the lead section 79 therefore hardly heats during power supply. For example, the lead section 79 may be made of a material having a lower volume resistivity than the material of the heating section 76 or have a larger cross-sectional area than the heating section 76 so as to have a lower resistance per unit length. In the present embodiment, the volume resistivity of the lead section 79 is reduced by adding a noble metal with a higher content than in the heating section 76, and the cross-sectional area of the lead section 79 is formed larger than that of the heating section 76 by setting the width of the lead section 79 to be larger than that of the heating section 76. The width of the lead section 79 in the left-right direction is substantially the same as the forward straight portion 78 at the joint therebetween and is increased toward the rear side.

A method for manufacturing the gas sensor 100 having the above-described structure will now be described. First, six ceramic green sheets containing an oxygen ion conductive solid electrolyte, such as zirconia, as a ceramic component, are prepared. In these green sheets, sheet holes used for positioning during printing or stacking, through-holes, and the like have been formed in advance. The green sheet for the spacer layer 5 is provided therein with a space for the gas delivering section that has been formed by punching, and the like. Then, different patterns are formed respectively on the ceramic green sheets for the first substrate layer 1, the second substrate layer 2, the third substrate layer 3, the first solid electrolyte layer 4, the spacer layer 5, and the second solid electrolyte layer 6 by pattern printing and drying. More specifically, the patterns to be formed are for, for example, the above-described electrodes, lead wires connected to the electrodes, the air introducing layer 48, the heater 72, and the like. For the pattern printing, a pattern forming paste prepared according to the characteristics required for the intended pattern is applied onto a green sheet by a known screen printing technique. The pattern forming paste for the heater 72 is a mixture containing the raw material (for example, a noble metal and ceramic particles) for the heater 72, an organic binder, and an organic solvent.

The pattern for the heater 72 is formed so that the unit resistance ratio R1/R2 will be less than 1, that is, so that the cross-sectional area ratio S2/S1 will be less than 1. For example, for satisfying the relationship width W1>width W2, a mask enabling such a pattern to be formed is used. For satisfying the relationship thickness D1>thickness D2, for example, the pattern forming paste for the inner region 91 is prepared so as to have a higher viscosity than the pattern forming paste for the outer region 92, or the number of printing operations for forming the pattern for the inner region 91 is increased.

After the various patterns are formed, the green sheets are dried. The drying process is performed by using a known drying means. After the pattern printing and drying are finished, the green sheets are subjected to printing of an adhesive paste for stacking and bonding the green sheets, followed by drying. Then, the resulting green sheets are stacked in a predetermined order with the holes in the sheets aligned. The stack is subjected to pressure bonding for forming a multilayer body by being heated to a predetermined temperature under a predetermined pressure. The resulting multilayer body includes a plurality of sensor elements 101. The multilayer body is cut into pieces having a size corresponding to the sensor element 101. The pieces of the multilayer body are sintered at a predetermined temperature to yield sensor elements 101.

The sensor element 101 thus produced is incorporated in a sensor assembly, and a protective cover, for example, is attached to the assembly. Thus, a gas sensor 100 is completed. The process for manufacturing a gas sensor has been known except for the technique of setting the unit resistance ratio R1/R2 to less than 1, and is disclosed in, for example, International Publication No. 2013/005491.

For use of the resulting gas sensor 100, the heater 72 is connected to a power source (for example, the alternator of an automobile) through the heater connector electrode 71, and a direct voltage (for example, 12 V to 14 V) is applied between the first lead 79a and the second lead 79b. The applied voltage causes a current to flow in the heating section 76. The heating section 76 thus heats. Thus, the entirety of the sensor element 101 is controlled to a temperature (for example, 700° C. to 900° C.) at which the solid electrolyte (of layers 1 to 6) is activated. At this time, the heating section 76 heats to high temperature. The heating section 76 is more likely to be oxidized and degraded as temperature rises. In addition, in general, the inner region is more likely to have high temperature than the outer regions. Accordingly, the inner region is more likely to be degraded. In the heater section 70 of the present embodiment, however, the unit resistance ratio R1/R2 is set to be less than 1 at one or more temperatures in the range of 700° C. to 900° C. Thus, the inner region 91 has a lower heating density than the outer region 92 at one or more temperatures in the range of 700° C. to 900° C., and accordingly, the temperature increase in the inner region 91 is suppressed. In other words, the temperature increase of the inner region 91, which is more likely to have high temperature, is canceled by reducing the heating density of the inner region 91. Thus, the degradation of the inner region 91, which is generally more likely to be degraded, can be reduced. Consequently, for example, disconnection in the inner region 91 is reduced, and the life of the inner region 91 is extended. The extension of the life of the inner region 91 leads to an extended life of the entire heater 72. If the temperature in the inner region 91 is lower than the case of having a unit resistance ratio R1/R2 of 1, the degradation of the inner region 91 can be reduced effectively. It is therefore not necessary that the temperature of the inner region 91 be lower than that of the outer region 92. For example, even if the temperature of the inner region 91 is higher than the outer region 92, the life of the heater 72 is extended when the thermal uniformity of the heating section 76 as a whole is higher than that in the case of having a unit resistance ratio R1/R2 of 1.

The relationship between the components of the present embodiment and the components of the present invention will now be clearly described. The heater section 70 of the present embodiment corresponds to the ceramic heater of the present invention; the heater 72 corresponds to the heating element; the inner region 91 corresponds to the inner region; the outer region 92 corresponds to the outer region; and the first substrate layer 1, the second substrate layer 2, and the third substrate layer 3 corresponds to the ceramic body. Also, the straight portion 78 corresponds to the straight portion; the head side curved portions 77a correspond to the one-end side curved portions; and the rear-side curved portion 77b corresponds to the other-end side curved portion.

In the gas sensor 100 of the present embodiment described above, the inner region 91 of the heater section 70 has a lower resistance per unit length than the outer region 92 at one or more temperatures in the range of 700° C. to 900° C. Thus, the inner region 91 have a lower heating density than the outer region 92 at one or more temperatures in the range of 700° C. to 900° C., and accordingly, the degradation of the inner region 91 is reduced. Thus, the life of the entire heater 72 (particularly the entire heating section 76) is extended.

In addition, by setting the unit resistance ratio R1/R2 to be 0.87 or less at one or more temperatures in the above temperature range, the degradation of the inner region 91 is reduced more effectively. Furthermore, by setting the unit resistance ratio R1/R2 to be 0.80 or less, the degradation of the inner region 91 is reduced still more effectively. Since the cross-section of the inner region 91 taken in the direction perpendicular to the length direction thereof has a larger area than that of the outer region 92, the resistance per unit length (unit resistance R1) of the inner region 91 tends to be lower than the unit resistance R2 of the outer region 92. Since the cross-sectional area ratio S2/S1 is 0.87 or less, the unit resistance ratio R1/R2 tends to be 0.87 or less at one or more temperatures in the above temperature range. Also, when the cross-sectional area ratio S2/S1 is 0.80 or less, the unit resistance ratio R1/R2 tends to be 0.80 or less at one or more temperatures in the above temperature range.

The ceramic body (the first substrate layer 1, the second substrate layer 2, and the third substrate layer 3) is a plate-like body having the longitudinal direction (front-rear direction) and the short-length direction (left-right direction), and the heater 72 includes four or more straight portions arranged along the short-length direction and each extending in the longitudinal direction, a plurality of head side curved portions 77a each connecting a pair of the straight portions 78 adjacent to each other in the short-length direction at one end (front end) in the longitudinal direction, and at least one rear side curved portion 77b connecting a pair of the straight portions 78 adjacent to each other in the short-length direction at the other end (rear end). The sensor element 101 includes the heater section 70 and detects the concentration of a specific gas in a measurement-object gas. The gas sensor 100 includes the sensor element 101.

The present invention is not limited to the above-described embodiment, and it should be appreciated that various embodiments can be applied to the invention within the technical scope of the invention.

For example, while the above-described embodiment has been described for the heating section 76 in which the inner region 91 and the outer region 92 defined by the first method or the third method (FIG. 2 or 4) have a unit resistance ratio R1/R2 of less than 1, the inner region 91 and the outer regions 92 defined by the second method may have a unit resistance ratio R1/R2 of less than 1. For example, only the cross-sectional area of the inner region 91 shown in FIG. 3 of the heating section 76 may be increased so that the cross-sectional area ratio S2/S1 is less than 1.

While the cross-sectional area ratio S2/S1 is less than 1 in the above-described embodiment, it is not limited thereto as long as the unit resistance ratio R1/R2 is less than 1 at one or more temperatures in the range of 700° C. to 900° C. For example, the inner region 91 may have a lower volume resistivity than the outer region 92 at one or more temperatures in that temperature range. Hence, the volume resistivity ratio ρ1/ρ2 of the volume resistivity ρ1 [μΩ·cm] of the inner region 91 to the volume resistivity ρ2 [μΩ·cm] of the outer region 92 may be less than 1 at one or more temperatures in the above temperature range. The unit resistance ratio R1/R2 thus can be set to be less than 1 at one or more temperatures in the above temperature range. Consequently, the degradation of the inner region 91 can be reduced to extend the life of the heater 72. Preferably, the volume resistivity ratio ρ1/ρ2 is 0.87 or less, more preferably 0.80 or less, at one or more temperatures in the above temperature range. For example, by setting the noble metal (electroconductive material) content in the inner region 91 to be higher than that in the outer region 92, volume resistivity ρ1 can be set to be lower than volume resistivity ρ2. Alternatively, by adding a noble metal (rhodium, gold, or the like) having a lower volume resistivity than platinum to the inner region 91 in addition to or instead of platinum while the outer region 92 mainly contain platinum, volume resistivity ρ1 can be set to be lower than volume resistivity ρ2. In other words, the inner region 91 may contain a noble metal that is not contained in the outer region 92 and has a lower volume resistivity than the noble metal contained in the outer region 92. Alternatively, by adding to the inner region 91 a material which has a lower temperature coefficient of resistance (unit: [%/° C.]) than the noble metal mainly contained in the inner region 91, with a higher proportion than in the outer region 92, volume resistivity ρ1 can be set to be lower than volume resistivity ρ2 at one or more temperatures in the above temperature range. Examples of the material which has a low temperature coefficient of resistance include Nichrome (alloy containing nickel (Ni) and chromium (Cr)), Kanthal (registered trademark, metal containing iron, chromium, and aluminum), and molybdenum disilicide ($MoSi_2$) and the like. Volume resistivities ρ1 and ρ2 are defined by the averages thereof of the inner region 91 and the outer region 92, respectively, as with unit resistances R1 and R2. The volume resistivity ratio ρ1/ρ2 may be 0.5 or more at any temperature in the above temperature range.

It may be combined in the heater section 70 to set the cross-sectional area ratio S2/S1 to be less than 1 and to set the volume resistivity ratio ρ1/ρ2 to be less than 1. For example, the product (=unit resistance ratio R1/R2) of the cross-sectional area ratio S2/S1 and the volume resistivity ratio ρ1/ρ2 may be set to be less than 1, 0.87 or less, or 0.80 or less at one or more temperatures in the above temperature range. When the cross-sectional area ratio S2/S1 is less than 1, the inner region 91 and the outer region 92 may be made of different materials.

Figure 5:
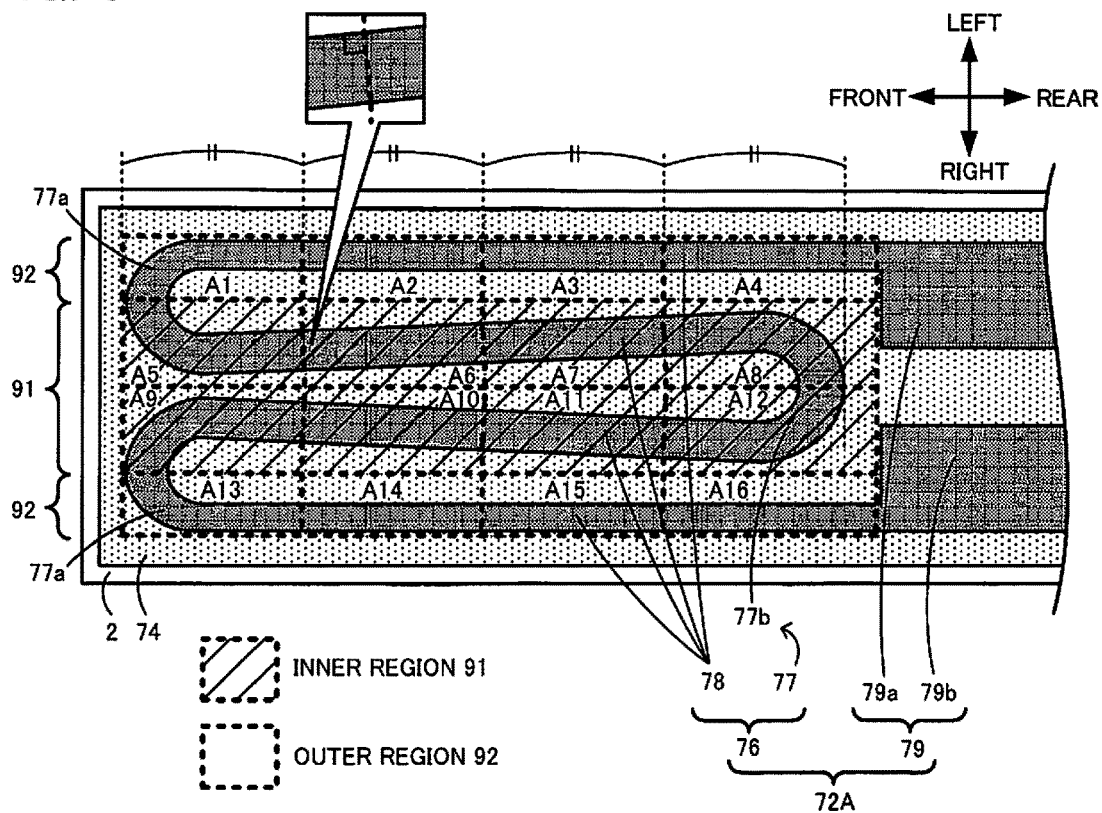
FIG. 5 is an explanatory view of a heater 72A according to a modification.

The shape (pattern) of the heater 72 in the heater section 70 is not limited to the above-described embodiment. The straight portions 78 are not necessarily parallel to each other as long as the length direction is along the longitudinal direction (front-rear direction) of the heater section 70. FIG. 5 is an explanatory view of a heater 72A according to a modification. In this heater 72A, the length direction of two straight portions 78 located at the center in the left-right direction among four straight portions 78 is along the longitudinal direction, but are tilted with respect to the longitudinal direction. More specifically, the second straight portion 78 from the left is inclined to the left side while extending to the rear side, and the second straight portion 78 from the right is inclined to the right side while extending to the rear side. This shape enables the curved portions 77 to have a larger radius (radius of curvature) than that of the heater 72 shown in FIG. 2. In other words, the width of the heating section 76 in the left-right direction can be reduced without reducing the radius of curvature of the curved portions 77. Also, unlike the shape shown in FIG. 2, the joints of the lead section 79 with the forward straight portions 78 have a wider width than the straight portions 78. This lead section 79 may have the same shape as in FIG. 2, or the lead section 79 of the heater 72 shown in FIG. 2 may have the same shape as in FIG. 5. The heater 72A of this modification can produce the same effect as in the above-described embodiment. For example, the degradation of the inner region 91 can be reduced to extend the life of the heater 76 by forming the inner region 91 and the outer region 92 so as to have a unit resistance ratio R1/R2 of less than 1 at one or more temperatures in the range of 700° C. to 900° C. FIG. 5 illustrates a structure in which the cross-sectional area (width) of the inner region 91 defined by the first method is entirely increased so that the cross-sectional area of the inner region 91 is larger than the cross-sectional area S2 of the outer region 92. For dividing the heating section 76 into 16 segments in accordance with any one of the first to the third method, the division lines (dashed lines in FIG. 5) are given perpendicular to the length direction of the portion of the heating section 76 in the corresponding segment. Therefore, a portion of the division line, for example, between the 5th segment A5 and the 6th segment A6 in FIG. 5, dividing the straight portions 78 are bent so as to be perpendicular to the length direction of the respective straight portion 78 (see the enlarged fragment in FIG. 5). Also, in FIG. 5, the two straight portions 78 at both sides in the left-right, connected to the lead section 79 extend to the rear side, beyond the rear end of the rear side curved portion 77b. In this instance, the portions of the straight portions 78, located to the rear side of the rear side curved portion 77b are considered to be in the closest segments (the 4th and the 16th segment A4 and A16), respectively.

While the above-described embodiment has been illustrated for the heating section 76 including three curved portions 77 and four straight portions 78, it is not limited thereto. For example, the number of the curved portions 77 may be three or more, and the number of the straight portions 78 may be four or more. The number of the straight portions 78 may be an even number of four or more. As for the numbers of the head side curved portions 77a and the rear side curved portions 77b, the above-described embodiment has been illustrated for the case of having two head side curved portions 77a and one rear side curved portion 77b. The numbers of these curved portions, however, may be varied according to the number of straight portions 78. For example, the number of the head side curved portions 77a may be two or more, or the number of the rear side curved portions 77b may be one or more. For dividing the heating section 76 in the left-right direction in accordance with any of the first to the third method, the number of the straight portions 78 included in each part of the heating section 76 is defined by the quotient obtained by dividing the number of the straight portions 78 by a value 4. If the number of straight portions 78 divided by 4 has a remainder, the number of straight portions corresponding to the remainder are considered to be in the inner region 91. For example, if the number of the straight portions 78 is six, the heating section is divided in such a manner that the number of the straight portions 78 in the 1st to the 4th segment A1 to A4 is one; the number of the straight portions 78 in the 5th to the 8th segment is two; the number of the straight portions in the 9th to the 12th segment A9 to A12 is two; and the number of the straight portions in the 13th to the 16th segment A13 to A16 is one.

Figure 6:
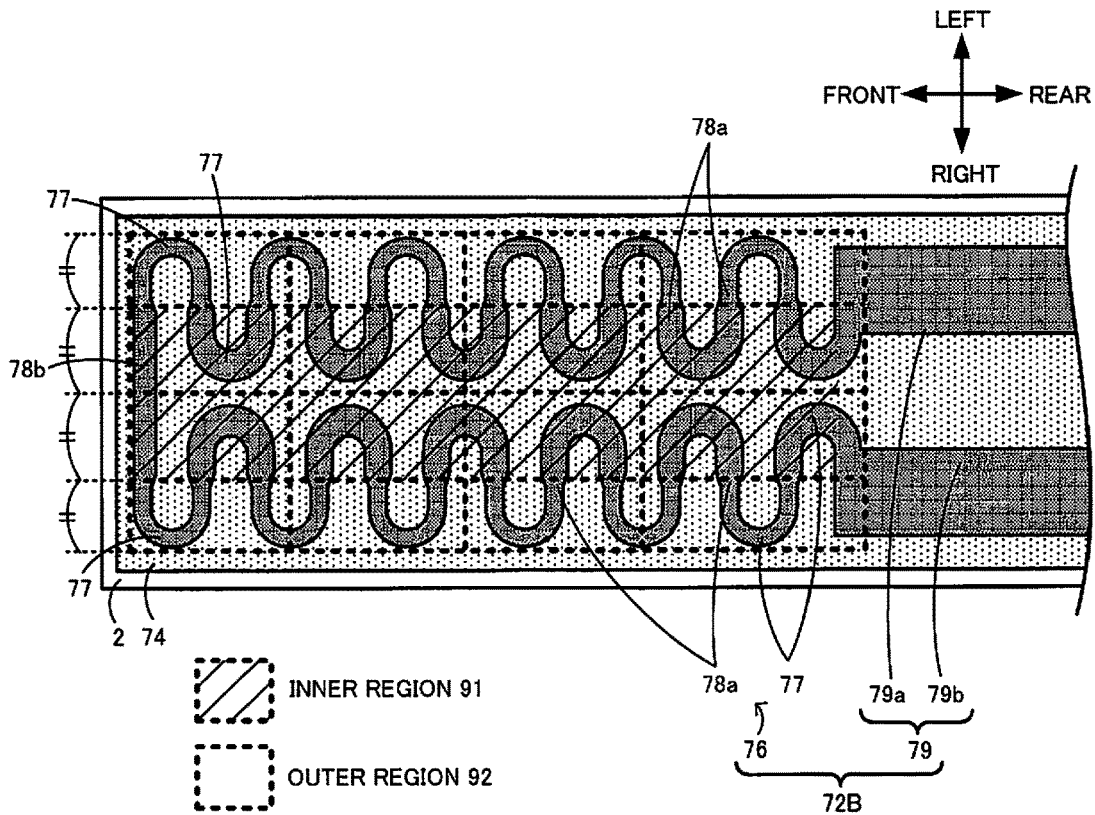
FIG. 6 is an explanatory view of a heater 72B according to a modification.

While the above-described embodiment has been illustrated for the straight portions 78 whose length direction is along the longitudinal direction (front-rear direction), the length direction of the straight portions 78 may be along the short-length direction (left-right direction) of the heater section 70. FIG. 6 is an explanatory view of a heater 72B according to a modification in this case. The heating section 76 of this heater 72B is formed in a one-stroke manner, and includes straight portions 78 including a plurality of straight portions 78a in two lines arranged in the short-length direction, each in which a plurality (11 in FIG. 6) of straight portions 78a are arranged in the longitudinal direction of the heater section 70, and a longer straight portion 78b than the plurality of straight portions 78a, disposed at one end (front end) in the longitudinal. The heating section 76 also includes a plurality (24 in FIG. 6) of curved portions 77 each connecting a pair of the straight portions 78 (straight portions 78a and 78b) adjacent in the longitudinal direction or connecting the rearmost straight portion 78a in the longitudinal direction and the lead section 79. The heater 72B of this modification can produce the same effect as in the above-described embodiment. For example, the degradation of the inner region 91 can be reduced to extend the life of the heater 76 by forming the inner region 91 and the outer region 92 defined by any of the first to the third method so as to have a unit resistance ratio R1/R2 of less than 1 at one or more temperatures in the range of 700° C. to 900° C. For dividing the heating section 76 shown in FIG. 6 into 16 segments in accordance with any one of the first to the third method, the dividing in the longitudinal direction (front-rear direction) and the dividing in the short-length direction (left-right direction), described with reference to FIG. 2 are reversed. Specifically, this operation is performed as below. For dividing in the front-rear direction, the entire region of the heating section 76 is divided in such a manner that each part of the heating section 76 includes at least one straight portion 78. The number of the straight portions 78 included in each part of the heating section 76 is defined by the quotient (3, in the present modification) obtained by dividing the number (12, in the present modification) of the straight portions 78 arranged in each line in the front-rear direction by a value 4. For dividing in the left-right direction, the region from the left end of the leftmost curved portions 77 to the right end of the rightmost curved portions 77 is evenly divided into four. FIG. 6 illustrates a structure in which the cross-sectional area (width) of the inner region 91 defined by the first method is entirely increased so that the cross-sectional area of the inner region 91 is larger than the cross-sectional area S2 of the outer region 92.

In FIG. 6, the number of the straight portions 78 arranged in each line in the front-rear direction is 12, and the number of the curved portions 77 is 24. It is however not limited thereto, and the number of the straight portions 78 in each line in the front-rear direction may be an even number of two or more, or the number of the curved portions 77 may be determined according to the number of the straight portions 78. If the number of straight portions 78 divided by 4 has a remainder, the number of straight portions corresponding to the remainder are considered to be in the inner region 91.

While the above-described embodiment has been illustrated for the case shown in FIG. 2 in which the head end curved portions 77a have a portion whose cross-sectional area is gradually varied along the length direction thereof, it is not limited thereto. For example, the width of the head end curved portions 77a may have a step, and thus the cross-sectional area of the head end curved portions 77a may be varied like a step function along the length direction thereof. Alternatively, the head end curved portions 77a have a constant cross-sectional area anywhere. These apply to the rear end curved portion 77b and the straight portions 78. It is, however, preferable that there be no step in the heating section 76. For giving different cross-sectional areas to a portion of the heating section 76, it is preferable to gradually vary the cross-sectional area so that the heating section 76 does not have a step, as shown in FIG. 2.

While the above-describe embodiment has been illustrated for the heater 72 in the form of a strip, it is not limited thereto and may be in the form of a line (for example, having a circular or oval cross section).

The shape of the heater 72 (particularly the heating section 76) is not limited to that shown in FIGS. 2 to 6. As with the heating element of the above-described embodiment, a heating element including portions in the outer region and portions in the inner region having a lower resistance per unit length than the outer region at one or more temperature in the range of 700° C. to 900° C. has a long life. For dividing a heating element in a different shape from the shape described above into 16 segments in accordance with any of the first to the third method, the region of the heating element is divided into four segments in the front-rear direction and into four segments in the left-right direction so that the sizes of the divided portions are as equal as possible, and so that the division lines are perpendicular to the length direction of the corresponding portions of the heating element.

While the above-described embodiment has been illustrated for the gas sensor 100 including the heater section 70, the present invention may be embodied as an independent sensor element 101, or an independent heater section 70, that is, an independent ceramic heater. While the heater section 70 described above includes the first substrate layer 1, the second substrate layer 2, and the third substrate layer 3, it is not limited thereto as long as it includes a ceramic body surrounding the heater 72. For example, the layer underlying the heater 72 may be defined by only a single layer, but not by the two layers of the first substrate layer 1 and the second substrate layer 2. While the heater section 70 described above includes the heater insulating layer 74, the heater insulating layer 74 may be omitted as long as the ceramic body (for example, the first substrate layer 1 and the second substrate layer 2) surrounding the heater 72 is made of an insulating material (such as alumina ceramic). The sensor element 101 may have a length in the range of 25 mm to 100 mm in the front-rear direction, a width in the range of 2 mm to 10 mm in the left-right direction, and a thickness in the range of 0.5 mm to 5 mm in the vertical direction.

EXAMPLES

Examples in which sensor elements were specifically manufactured will now be described. Experimental Examples 2 to 9 and 11 to 18 correspond to Examples of the present invention, and Experiment Examples 1 and 10 correspond to Comparative Examples. It should be noted that the invention is not limited to the examples below.

Experimental Examples 1 to 9

Sensor elements 101 as shown in FIGS. 1 and 2 were prepared as Experimental Examples 1 to 9 in accordance with the method for manufacturing the gas sensor 100 of the above-described embodiment. Experimental Examples 1 to 9 had the same structure except that the cross-sectional area ratio S2/S1 in the inner region 91 and the outer regions 92 defined by the first method was varied as shown in Table 1 by varying the width W1 of the inner region 91. The sensor element 101 measured 67.5 mm in length in the front-rear direction, 4.25 mm in width in the left-right direction, and 1.45 mm in thickness in the vertical direction. In Experimental Example 1, the width W1 of the inner region 91 and the width W2 of the outer region 92 were each 0.25 mm. In Experimental Example 1, the thickness D1 of the inner region 91 and the thickness D2 of the outer region 92 were each 0.01 mm. For producing the sensor element 101, ceramic green sheets were formed of a mixture of zirconia particles containing 4% by mole of yttria as a stabilizing agent, an organic binder, and an organic solvent by tape formation. The electroconductive paste for forming the heating section 76 of the heater section 70 was prepared as below. A preliminary mixture was prepared by preliminarily mixing 4% by mass of alumina particles, 96% by mass of Pt, and a predetermined amount of acetone as a solvent. An organic binder liquid prepared by dissolving 20% by mass of polyvinyl butyral in 80% by mass of butyl carbitol was added to the preliminary mixture, and then butyl carbitol was added as needed to adjust the viscosity. Thus, the electroconductive paste was prepared. In Experimental Example 1, the inner region 91 and the outer region 92 were formed of the same electroconductive paste; hence the volume resistivity ratio ρ1/ρ2 was 1 at any temperature in the range of 700° C. to 900° C. The same applies to Experimental Examples 2 to 9.

Experimental Examples 10 to 18

Sensor elements 101 of Experimental Examples 10 to 18 were produced in the same manner as in Experimental Example 1 except that the volume resistivity ratio ρ1/ρ2 of the inner region 91 and the outer regions 92 defined by the first method was varied as shown in Table 1. The volume resistivity ratio ρ1/ρ2 was varied by varying the Pt content in the inner region 91. In each of Experimental Examples 10 to 18, widths W1 and W2 and thicknesses D1 and D2 were the same as in Experimental Example 1, and the cross-sectional area ratio S2/S1 in Experimental Examples 10 to 18 was 1.00. In Experimental Examples 10 and 1, the cross-sectional area ratio S2/S1 and the volume resistivity ratio ρ1/ρ2 were the same.

The volume resistivity ρ1 in Experimental Examples 10 to 18 was measured using test pieces prepared as below. An insulating paste for the heater insulating layer 74 was applied by printing onto a ceramic green sheet that would be sintered into the second substrate layer 2. Subsequently, an electroconductive paste prepared under the same conditions as the respective electroconductive paste of the inner region 91 of Experimental Examples 10 to 18 was applied onto the insulating paste so as to form a rectangular parallelepiped. Then, the ceramic green sheet was sintered under the same conditions as in Experimental Examples 10 to 18. The heating sections thus formed in the shape of a rectangular parallelepiped were used as test pieces of Experimental Examples 10 to 18. Leads for measuring resistance were connected to each rectangular parallelepipedal heating section. The resulting test piece was heated to 700° C. to 900° C. in an electric furnace, and the resistance of the heating section was measured in this state. Thus, volume resistivity ρ1 was calculated using the length of the rectangular parallelepipedal heating section, the cross-sectional area, and the measured resistance. Similarly, volume resistivity ρ2 was calculated from the results of measurement using the test piece. In Experimental Examples 10 to 18, the volume resistivity ratio ρ1/ρ2 hardly varied in the range of 700° C. to 900° C.

Examination for Evaluation

The durability (lifetime) of the heating section 76 of Experimental Examples 1 to 18 was examined. More specifically, a voltage was applied to the lead section 79 for supplying electricity to the heater 72 so that the heating section 76 would have a predetermined average temperature. Then, it was examined whether or not disconnection occurred in the heating section 76 within 2000 hours. When disconnection did not occur beyond 2000 hours, the durability was rated as "A (excellent, better than practical level)"; when disconnection occurred in the range of more than 1000 to 2000 or less, the durability was rated as "B (good, practical level)"; and when disconnection occurred within 1000 hours, the durability was rated as "C (failure, worse than practical level)". The durability of the heating section 76 was examined in each of the cases in which the heating section 76 had an average temperature of 700° C., 750° C., 800° C., 850° C., and 900° C. The temperature of the heating section 76 was controlled by varying the voltage to be applied to the lead section 79. The temperature of the heating section 76 was indirectly measured by measuring the bottom temperature of the sensor element 101 with a radiation thermometer. The results of the examinations are shown in Table 1. Table 1 also shows the unit resistance ratio R1/R2, the cross-sectional area ratio S2/S1, and the volume resistivity ratio ρ1/ρ2 of each Experimental Example. The unit resistance ratio R1/R2 was calculated as the product of the cross-sectional area ratio S2/S1 and the volume resistivity ratio ρ1/ρ2. The unit resistance ratio R1/R2, the cross-sectional area ratio S2/S1, and the volume resistivity ratio ρ1/ρ2 shown in Table 1 are each the value in the case where the inner region 91 and the outer regions 92 were defined by the first method.

TABLE 1

|  | Unit Resistance Ratio | Cross-Sectional Area Ratio | Volume Resistivity Ratio | Average Temperature of Heating Section (° C.) | | | | |
|---|---|---|---|---|---|---|---|---|
|  | R1/R2 | S2/S1 | ρ1/ρ2 | 700 | 750 | 800 | 850 | 900 |
| Experimental Example 1 | 1.00 | 1.00 | 1.00 | C | C | C | C | C |
| Experimental Example 2 | 0.95 | 0.95 | 1.00 | C | C | C | C | C |
| Experimental Example 3 | 0.91 | 0.91 | 1.00 | C | C | C | C | C |
| Experimental Example 4 | 0.87 | 0.87 | 1.00 | A | B | B | B | B |
| Experimental Example 5 | 0.83 | 0.83 | 1.00 | A | A | B | B | B |
| Experimental Example 6 | 0.80 | 0.80 | 1.00 | A | A | A | A | A |
| Experimental Example 7 | 0.77 | 0.77 | 1.00 | A | A | A | A | A |
| Experimental Example 8 | 0.74 | 0.74 | 1.00 | A | A | A | A | A |
| Experimental Example 9 | 0.71 | 0.71 | 1.00 | A | A | A | A | A |

TABLE 1-continued

|  | Unit Resistance Ratio | Cross-Sectional Area Ratio | Volume Resistivity Ratio | Average Temperature of Heating Section (° C.) | | | | |
|---|---|---|---|---|---|---|---|---|
|  | R1/R2 | S2/S1 | ρ1/ρ2 | 700 | 750 | 800 | 850 | 900 |
| Experimental Example 10 | 1.00 | 1.00 | 1.00 | C | C | C | C | C |
| Experimental Example 11 | 0.95 | 1.00 | 0.95 | C | C | C | C | C |
| Experimental Example 12 | 0.91 | 1.00 | 0.91 | C | C | C | C | C |
| Experimental Example 13 | 0.87 | 1.00 | 0.87 | A | B | B | B | B |
| Experimental Example 14 | 0.83 | 1.00 | 0.83 | A | A | B | B | B |
| Experimental Example 15 | 0.80 | 1.00 | 0.80 | A | A | A | A | A |
| Experimental Example 16 | 0.77 | 1.00 | 0.77 | A | A | A | A | A |
| Experimental Example 17 | 0.74 | 1.00 | 0.74 | A | A | A | A | A |
| Experimental Example 18 | 0.71 | 1.00 | 0.71 | A | A | A | A | A |

A: Excellent,
B: Good,
C: Failure

Table 1 shows that disconnection in the heating section 76 is less likely to occur as the unit resistance ratio R1/R2 decreases. It was also observed that disconnection in the heating section 76 is less likely to occur even at high temperatures, as the unit resistance ratio R1/R2 decreases. In Experimental Examples 4 to 9 and 13 to 18 in which the unit resistance ratio R1/R2 was set to 0.87 or less, the examination results were rated as A (excellent) or B (good) at any temperature in the range of 700° C. to 900° C. In Experimental Examples 6 to 9 and 15 to 18 in which the unit resistance ratio R1/R2 was set to 0.80 or less, the examination results were rated as A (excellent) at any temperature in the range of 700° C. to 900° C. In any of the Experimental Examples rated as B (good) or C (failure), disconnection occurred in the inner region 91. The comparison between Experimental Examples 1 to 9 and Experimental Examples 10 to 18 shows that the examples in which the unit resistance ratio R1/R2 was the same as each other produced the same results in both the case of varying the cross-sectional area ratio S2/S1 and the case of varying the volume resistivity ratio ρ1/ρ2. When the cross-sectional area ratio S2/S1 was varied by varying the thickness D1 of the inner region 91, the same results as in Experimental Examples 1 to 9 were produced.

The present application claims priority from Japanese Patent Application No. 2015-164212 filed on Aug. 21, 2015, the entire contents of which are incorporated herein by reference.

What is claimed is:

1. A ceramic heater comprising:
   a heating element including an outer region, and an inner region having a lower average resistance per unit length than the outer region at a temperature in a range of 700° C. to 900° C., and
   a ceramic body surrounding the heating element,
   the outer region comprising a first outer region and a second outer region,
   the inner region disposed between the first outer region and the second outer region,
   the heating element including a plurality of straight portions and at least one curved portion connecting the plurality of straight portions,
   the inner region, the first outer region, and the second outer region each including at least one of the plurality of straight portions,
   at least one of the inner region and the outer region including one of the at least one curved portion of the heating element, and
   the inner region of the heating element defined as a rectangular region that has a prescribed length and a prescribed width and is surrounded on at least two sides by the outer region, wherein:
   a ratio R1/R2 of unit resistance R1 (μΩ/mm) being the resistance per unit length of the inner region to unit resistance R2 (μΩ/mm) being the resistance per unit length of the outer region is no larger than 0.87 at a temperature in the temperature range, and
   a cross-sectional area ratio S2/S1 S2 being an average cross-sectional area (mm²) of the outer region taken in a direction perpendicular to the length direction thereof, and S1 being an average cross-sectional area (mm²) of the inner region taken a direction perpendicular to the length direction thereof, is no larger than 0.87.

2. The ceramic heater according to claim 1,
   wherein the unit resistance ratio R1/R2 is no larger than 0.80 at a temperature in the temperature range.

3. The ceramic heater according to claim 1,
   wherein the cross-sectional area ratio S2/S1 is no larger than 0.80.

4. The ceramic heater according to claim 1,
   wherein the inner region has a lower volume resistivity than the outer region at a temperature in the temperature range.

5. The ceramic heater according to claim 4,
   wherein a ratio ρ1/ρ2 of a volume resistivity ρ1 (μΩ·cm) of the inner region to the volume resistivity ρ2 (μΩ·cm) of the outer region is no larger than 0.87 at a temperature in the temperature range.

6. The ceramic heater according to claim 5,
   wherein the volume resistivity ratio ρ1/ρ2 is no larger than 0.80 at a temperature in the temperature range.

7. The ceramic heater according to claim 1,
   wherein the ceramic body is a plate-like body having a longitudinal direction and a short-length direction,
   wherein the plurality of straight portions includes four or more linear portions that are arranged along the short-length direction and whose length direction is along the longitudinal direction,
   wherein the at least one curved portion includes a plurality of first curved portions each connecting a pair of the straight portions adjacent to each other in the short-length direction at a first end in the longitudinal direction, and at least one second curved portion connecting a pair of the straight portions adjacent to each other in the short-length direction at a second end in the longitudinal direction, the second end being opposite the first end in the longitudinal direction.

8. A sensor element adapted to detect a concentration of a specific gas in a measurement-object gas, the sensor element comprising the ceramic heater according to claim 1.

9. A gas sensor comprising the sensor element according to claim 8.

10. The ceramic heater according to claim 7,
wherein the plurality of first curved portions is disposed closer to a front side of the ceramic body in the longitudinal direction of the ceramic body than the at least one second curved portion, and
each of the plurality of first curved portions has a front end with a substantially same position in the longitudinal direction of the ceramic body.

11. The ceramic heater according to claim 1,
wherein the ceramic body is a plate-like body having a longitudinal direction and a short-length direction,
wherein the plurality of straight portions includes four or more straight portions that are arranged along the longitudinal direction and whose length direction is along the short-length direction, and
wherein the at least one curved portion includes a plurality of first curved portions each connecting a pair of the straight portions adjacent to each other in the longitudinal direction at a first end in the short-length direction, and at least one second curved portion connecting a pair of the straight portions adjacent to each other in the longitudinal direction at a second end in the short-length direction, the second end being opposite the first end in the short-length direction.

12. The ceramic heater according to claim 1,
wherein the heating element is formed of a material comprising a noble metal.

* * * * *